(12) United States Patent
Herrero et al.

(10) Patent No.: US 7,488,527 B2
(45) Date of Patent: Feb. 10, 2009

(54) MOLDED TOUCH FASTENERS

(75) Inventors: Emilio Munoz Herrero, Barcelona (ES); Luis Parellada Armela, Palafrugell (ES); Daniel Lee Janzen, Brampton (CA); Kevin Keith Line, Port Severn (CA); Christopher M. Gallant, Nottingham, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 11/725,142

(22) Filed: Mar. 15, 2007

(65) Prior Publication Data
US 2007/0194611 A1    Aug. 23, 2007

Related U.S. Application Data

(60) Division of application No. 11/467,436, filed on Aug. 25, 2006, now abandoned, which is a continuation of application No. 10/997,748, filed on Nov. 24, 2004, now Pat. No. 7,108,814.

(51) Int. Cl.
*A44B 21/00* (2006.01)
(52) U.S. Cl. ............... 428/100; 428/99; 428/900; 428/304.4; 24/306; 24/442
(58) Field of Classification Search ............ 428/99, 428/100, 900, 304.4; 24/306, 442
See application file for complete search history.

(56) References Cited

U.S. PATENT DOCUMENTS

| | | | |
|---|---|---|---|
| 3,134,152 A | 5/1964 | Pei |
| 3,494,006 A | 2/1970 | Brumlik |
| 3,522,637 A | 8/1970 | Brumlik |
| 3,527,001 A | 9/1970 | Kleemeier et al. |
| 3,913,183 A | 10/1975 | Brumlik |
| 4,025,686 A | 5/1977 | Zion |
| 4,396,503 A | 8/1983 | Schmidt |
| 4,710,414 A | 12/1987 | Northrup et al. |
| 4,775,310 A | 10/1988 | Fischer |
| 4,776,068 A | 10/1988 | Smirlock et al. |
| 4,842,916 A | 6/1989 | Ogawa et al. |
| 4,933,224 A | 6/1990 | Hatch et al. |
| 4,959,265 A | 9/1990 | Wood et al. |
| 5,286,431 A | 2/1994 | Banfield et al. |
| 5,427,864 A | 6/1995 | Hikasa et al. |
| 5,540,970 A | 7/1996 | Banfield et al. |
| 5,554,239 A | 9/1996 | Datta et al. |
| 5,611,122 A | 3/1997 | Torigoe et al. |
| 5,620,769 A | 4/1997 | Wessels et al. |

(Continued)

FOREIGN PATENT DOCUMENTS

JP    05-211909    8/1993

(Continued)

*Primary Examiner*—Alexander Thomas
(74) *Attorney, Agent, or Firm*—Fish & Richardson P.C.

(57) ABSTRACT

Touch fastener, molded articles having touch fasteners and methods of making such touch fasteners and articles are provided. The touch fasteners include a sheet form base having an upper face and a lower face; a plurality of male fastener elements, each fastener element having a stem molded integrally with and extending from the upper face of the sheet form base; and a foam or fibrous non-woven material adjacent to the upper face of the sheet form base, wherein at least a portion of the foam or fibrous non-woven material is disposed between at least a portion of the fastening elements.

27 Claims, 11 Drawing Sheets

U.S. PATENT DOCUMENTS

| | | |
|---|---|---|
| 5,643,651 A | 7/1997 | Murasaki |
| 5,669,120 A | 9/1997 | Wessels et al. |
| 5,695,845 A | 12/1997 | Ogawa et al. |
| 5,725,928 A * | 3/1998 | Kenney et al. .............. 428/100 |
| 5,736,217 A * | 4/1998 | Banfield et al. ............. 428/100 |
| 5,766,385 A | 6/1998 | Pollard et al. |
| 5,766,723 A | 6/1998 | Oborny et al. |
| 5,786,061 A | 7/1998 | Banfield |
| 5,819,391 A | 10/1998 | Matsushima et al. |
| 5,853,842 A | 12/1998 | Gallagher et al. |
| 5,942,177 A | 8/1999 | Banfield |
| 6,060,146 A | 5/2000 | Akeno et al. |
| 6,115,891 A | 9/2000 | Suenaga et al. |
| 6,143,222 A | 11/2000 | Takizawa et al. |
| 6,174,476 B1 | 1/2001 | Kennedy et al. |
| 6,187,247 B1 | 2/2001 | Buzzell et al. |
| 6,463,635 B2 | 10/2002 | Murasaki |
| 6,540,863 B2 | 4/2003 | Kenney et al. |
| 6,572,808 B1 | 6/2003 | Saito et al. |
| 2001/0001283 A1 | 5/2001 | Kennedy et al. |
| 2003/0012921 A1 | 1/2003 | Gallant et al. |
| 2004/0045142 A1 | 3/2004 | Buzzell et al. |

FOREIGN PATENT DOCUMENTS

| | | |
|---|---|---|
| JP | 2788564 | 8/1998 |
| WO | WO92/19119 | 11/1992 |
| WO | WO95/01741 | 1/1995 |
| WO | WO96/25063 | 8/1996 |

* cited by examiner

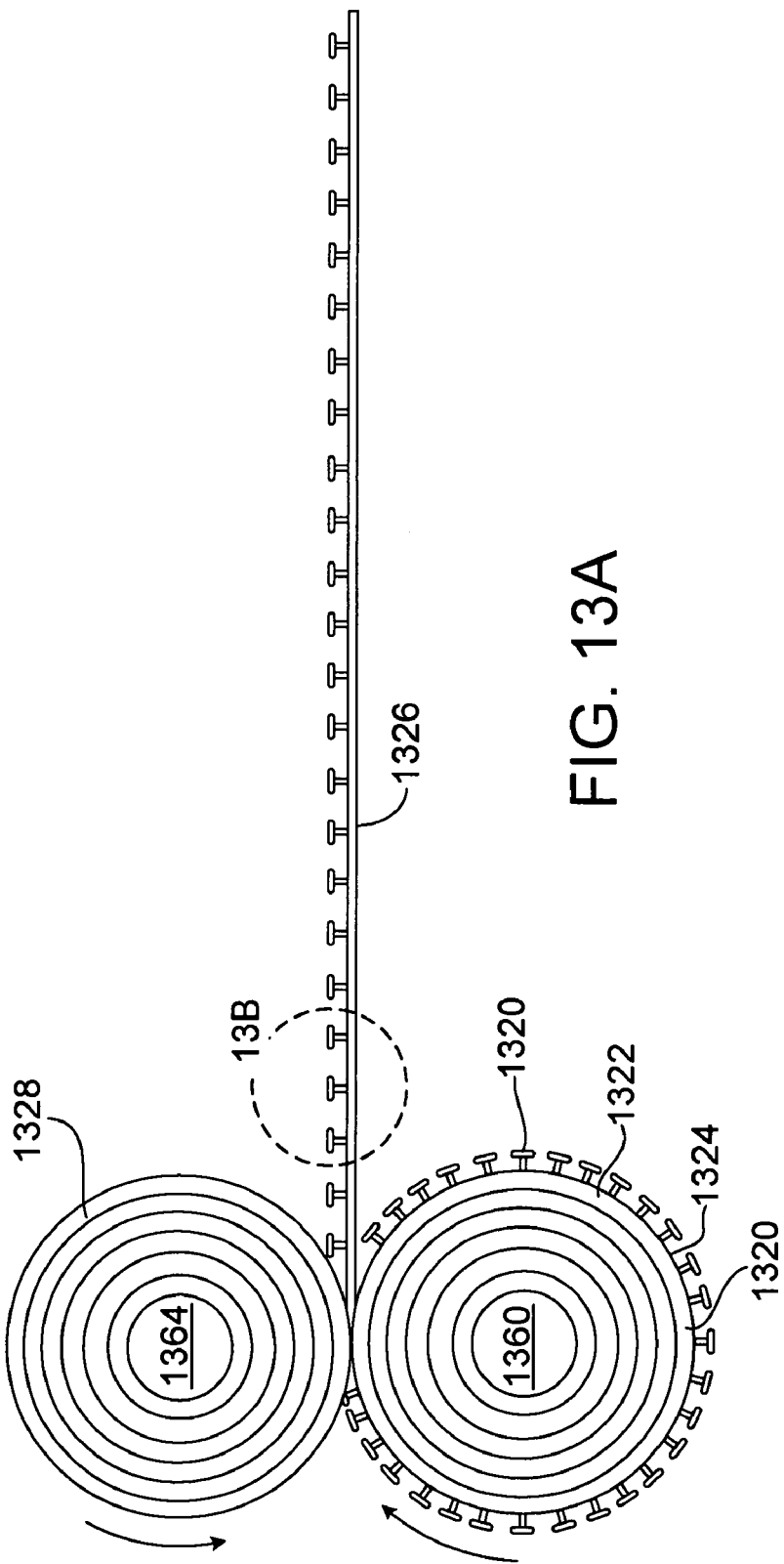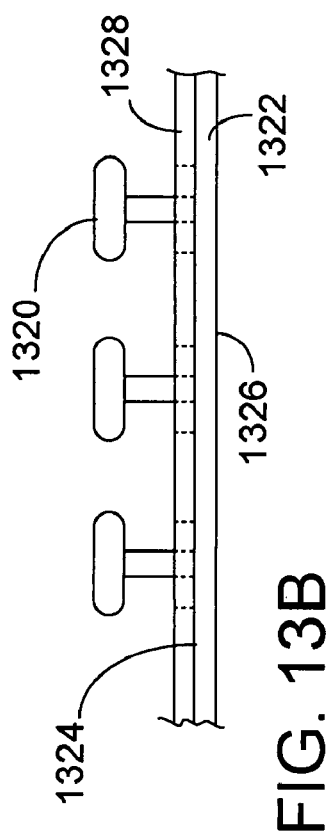
FIG. 13A
FIG. 13B

US 7,488,527 B2

MOLDED TOUCH FASTENERS

This application is a divisional of U.S. application Ser. No. 11/462,136, filed Aug. 25, 2006, now abandoned, which is a divisional of U.S. application Ser. No. 19/997,748, filed Nov. 24, 2004, now U.S. Pat. 7,108,814. The disclosure of the prior applications are considered part of (and is incorporated by reference in) the disclosure of this application.

TECHNICAL FIELD

This invention relates to molded touch fasteners, and methods of manufacturing and using the touch fasteners.

BACKGROUND

In recent years seats for cars and light trucks have been formed by molding a foam bun that will serve as the seat cushion, and then attaching a pre-stitched fabric cover to the foam bun. Often, the fabric cover is attached to the foam bun by insert molding touch fastener strips into the outer surface of the foam bun and attaching cooperating touch fastener strips to an inner surface of the fabric cover. Generally, the fastener strips are attached to the fabric cover along the seams where the cover is stitched together and held in place by the seam stitching. The touch fastener strips allow the seat manufacturer to rapidly and semi-permanently attach the fabric cover to the foam bun by pulling the fabric cover over the foam bun and pressing the opposed touch fastener strips on the foam bun and fabric cover together.

The touch fastener strips on the foam bun are typically recessed in trenches to allow the seams in the fabric cover to be indented below the surface of the seat cushion. Indenting the seams in this manner forms aesthetically appealing indented creases in the surface of the seat cushion upholstery for a tailored look.

Conventionally, the touch fastener is positioned in the mold such that the touch fastening surface is flush against a surface of the mold causing the touch fastening surface to be exposed in the finished foam product. Accordingly, when using such a molding process, care must be taken to avoid fouling of the touch fastening surface with the liquid foamable composition. For example, referring to FIG. 1A, a touch fastener 10 is placed in a mold cavity 114 with the fastener elements 20 positioned adjacent a depression 112 in a mold surface 110 for the positioning of the touch fastener 10. Referring to FIG. 1B, once the touch fastener 10 is correctly positioned into the depression 112 in the mold surface 110, a liquid foaming material 111, such as a two component system, is poured or injected into the mold cavity 114. The foaming material then solidifies, and the entire foam block is removed with the touch fasteners 10 adhered to its surface.

During this process, some liquid foaming material can leak around the edges of the base of the touch fastener into the space between the fastener elements (e.g., hooks), which are positioned inside the depression of the mold cavity. Leaking of the foaming material into the fastener elements can, in some cases, be reduced or prevented by providing a seal or gasket in between the touch fastener 10 and the portion of the mold surface 110 surrounding the depression 112.

Some attempts to prevent fouling include attaching a temporary, removable tape or film over the touch fastening surface during the molding process, and disposing a seal around the peripheral margin of the fastener elements. See for example, U.S. Pat. Nos. 4,842,916 and 5,766,723.

SUMMARY

In one aspect, the invention includes a seat cushion including a foam bun, having an elongated trench, and disposed in the elongated trench, a touch fastener having an upper and lower face, a plurality of male fastener elements, each fastener element having a stem molded integrally with and extending from the upper face of the sheet form base, and a foam disposed adjacent to the upper face of the sheet form base, wherein at least a portion of the foam is disposed between some of the fastener elements, the lower face of the sheet form base being bonded to the elongated trench of the foam bun.

In some embodiments, the seat cushion also includes a fabric cover covering an outer surface of the foam bun, the fabric cover having an inner surface carrying a cooperating touch fastener that is positioned to engage the touch fastener on the foam bun. In some embodiments, the foam extends beyond the sheet form base and is bonded to the foam bun.

In another aspect, the invention includes a method of making a touch fastener having a sheet form base and a plurality of fastener elements extending from the base. The method includes continuously introducing molten resin to a gap formed along a peripheral surface of a rotating mold roll, such that the resin forms at least a part of the sheet-form base at the peripheral mold roll surface and fills an array of fixed cavities defined in the rotating mold roll to form the fastener elements or portions thereof; while continuously introducing a foam (or a non-woven material) into the gap between the mold roll and the molten resin, solidifying the resin; and removing the solidified resin from the peripheral surface of the mold roll by pulling the projections from their respective cavities.

In some embodiments, the method includes one or more of the following features. The method can also include causing the foam to become physically bonded to the resin of the sheet form base and become part of the sheet form base of the product. The foam (or non-woven material) can be lengthwise continuous and introduced as a running length. The gap can be defined between the mold roll and a counter-rotating pressure roll, or the gap can be defined between the mold roll and an injection die. The method can also include burning at least a portion of the foam. The cavities can form preformed stems and the method further including flat-topping the stems to form fastener elements.

In another aspect, the invention includes a method of making a touch fastener having a sheet form base and a plurality of fastener elements extending from the base. The method includes continuously introducing a sheet form base into a gap formed along a peripheral surface of a fastener roll and a material roll, the sheet form base having an upper face, a lower face, and a plurality of fastener elements or portions thereof, each fastener element or portion thereof having a stem molded integrally with and extending from the upper face of the sheet form base; continuously introducing a foam (or non-woven material) into the gap between the fastener roll and the material roll, the foam or non-woven material having openings; and applying pressure at the gap between the fastener roll and the material roll, causing the openings of the foam to become engaged with the male fastener elements of the sheet form base.

In some embodiments, the method includes one or more of the following features. The cavities can form preformed stems and the method further including flat-topping the stems to form fastener elements. The male fastener elements of the sheet form base can be co-registered with the openings of the foam or fibrous non-woven material. The openings can include holes or slits.

In another aspect, the invention includes a method of forming a seat cushion including a foam bun. The method includes providing a mold cavity having a shape corresponding to the shape of the foam bun; positioning a touch fastener in the mold cavity, the touch fastener including a sheet form base having an upper face and a lower face; a plurality of male fastener elements, each fastener element having a stem molded integrally with and extending from the upper face of the sheet form base, and a foam (or non-woven material) attached to the upper face of the sheet form base, wherein at least a portion of the foam (or non-woven material) is disposed between at least some of the fastening elements, so that the foam (or non-woven material) of the touch fastener makes a seal with the surface of the mold; and delivering a foam into the mold cavity and allowing the foam to solidify.

In some embodiments, the method includes one or more of the following features. The foam (or fibrous non-woven material) extends longitudinally beyond the sheet form base. The touch fastener also includes metal particles, for example, embedded in the fastening elements, coated on the lower-face of the sheet form base, or embedded in the foam.

In another aspect, the invention includes a molded polymeric article, including; a body having an outer surface; and a touch fastener component adhered to the surface, the touch fastener component including a sheet form base having an upper face and a lower face, a plurality of male fastener elements, each fastener element having a stem molded integrally with and extending from the upper face of the sheet form base, and a foam positioned adjacent to the upper face of the sheet form base, the foam extending to a height greater than the height of the male fastener elements, wherein at least a portion of the foam is disposed between at least some of the fastening elements.

In some embodiments, the molded polymeric article includes one or more of the following features. The foam can cover substantially the entire upper face of the sheet form base. The height of the foam can be greater than the height of the fastener elements. The article can also include a plurality of fastening components, each fastening segment including a length and a width wherein the plurality of fastener segments are arranged adjacent each other along the length, and located between and joining each adjacent pair of fastening components, a flexible neck. The flexible neck can be positioned at approximately a midpoint of each component width, wherein the neck is narrower than the fastening segment, integral with the sheet form base of one or more adjacent fastening segments, and substantially uniform in composition with the sheet form base of one or more adjacent segments. The touch fastener can be arranged such that segments of the fastener component are angled relative to each other in a plane.

In another aspect, the invention includes a method of forming a molded polymeric article having a segmented touch fastener component, by providing a mold having a surface that defines a depression, where the depression follows a path having at least two portions that are angled relative to each other in a plane, locating in the depression a touch fastener component including a plurality of fastening segments, each fastening segment having a length and a width, wherein the plurality of fastening segments are arranged adjacent each other along said length, each fastening segment further including; i. a sheet form base having an upper face and a lower face; ii. an array of male fastener elements, each fastener element having a stem molded integrally with and extending from the upper face of the sheet form base; and iii. a foam (or fibrous non-woven material) positioned adjacent to the upper face of the sheet form base, wherein at least a portion of the foam (or fibrous non-woven material) is disposed between at least a portion of the fastening elements; and iv. located between and joining each adjacent pair of fastening segments, a flexible neck; providing the separable component arranged in the depression such that it bends at the flexible neck and follows the path through the at least two portions that are angled relative to each other, such that the segments are angled relative to each other within a plane defined by the sheet form bases of the fastening elements; delivering a liquid molding material into the mold such that the molding material substantially covers at least the surface of the mold in which the depression resides, wherein the molding material contacts a significant portion of the sheet form base of the fastening component; and allowing the molding material to solidify to form the molded polymeric body, whereby the fastening component is secured to the molded body. In some embodiments, the foam (or fibrous non-woven material) around at least a portion of the perimeter forms a gasket with the perimeter of the depression.

In another aspect, the invention includes a touch fastener, including a plurality of fastening segments, each fastening segment having a length and a width, wherein the plurality of fastening segments are arranged adjacent each other along said length, each fastening segment further including; i. a sheet form base having an upper face and a lower face; ii. an array of male fastener elements, each fastener element having a stem molded integrally with and extending from the upper face of the sheet form base; and iii. a foam or fibrous non-woven material attached to the upper face of the sheet form base wherein a portion of the foam or fibrous non-woven material is disposed between at least some of the fastener elements; and b. located between and joining each adjacent pair of fastening segments, a flexible neck. In some embodiments, the flexible neck is located at approximately a midpoint of each segment width, wherein the flexible neck is; a. narrower than said fastening segment; b. integral with the base member of one or more adjacent segments; and c. substantially uniform in composition with the sheet form base of one or more adjacent segments. In some embodiments, the foam or fibrous non-woven material extends around at least a portion of the array of fastener elements.

The touch fasteners described herein provide features that are useful in molding processes. For example, the foam can provide a seal or barrier, which prevents material, e.g., foaming material, from entering into the area between the fastener elements, and accordingly, can significantly reduce fouling of the touch fastener. Moreover, the touch fasteners can be produced with only relatively minor modifications of known manufacturing processes, thus reducing manufacturing costs relative to touch fasteners having a sealing element that is added to and/or removed from the touch fastener in a subsequent manufacturing step.

The details of one or more embodiments of the invention are set forth in the accompanying drawings and the description below. Other features and advantages of the invention will be apparent from the description and drawings, and from the claims.

DESCRIPTION OF DRAWINGS

FIG. 13A shows a process for manufacturing a touch fastener having foam or other material disposed between preformed fastener elements. FIG. 13B is an enlarged view of area 13B of FIG. 13A.

Like reference symbols in the various drawings indicate like elements.

DETAILED DESCRIPTION

Figure 1B:
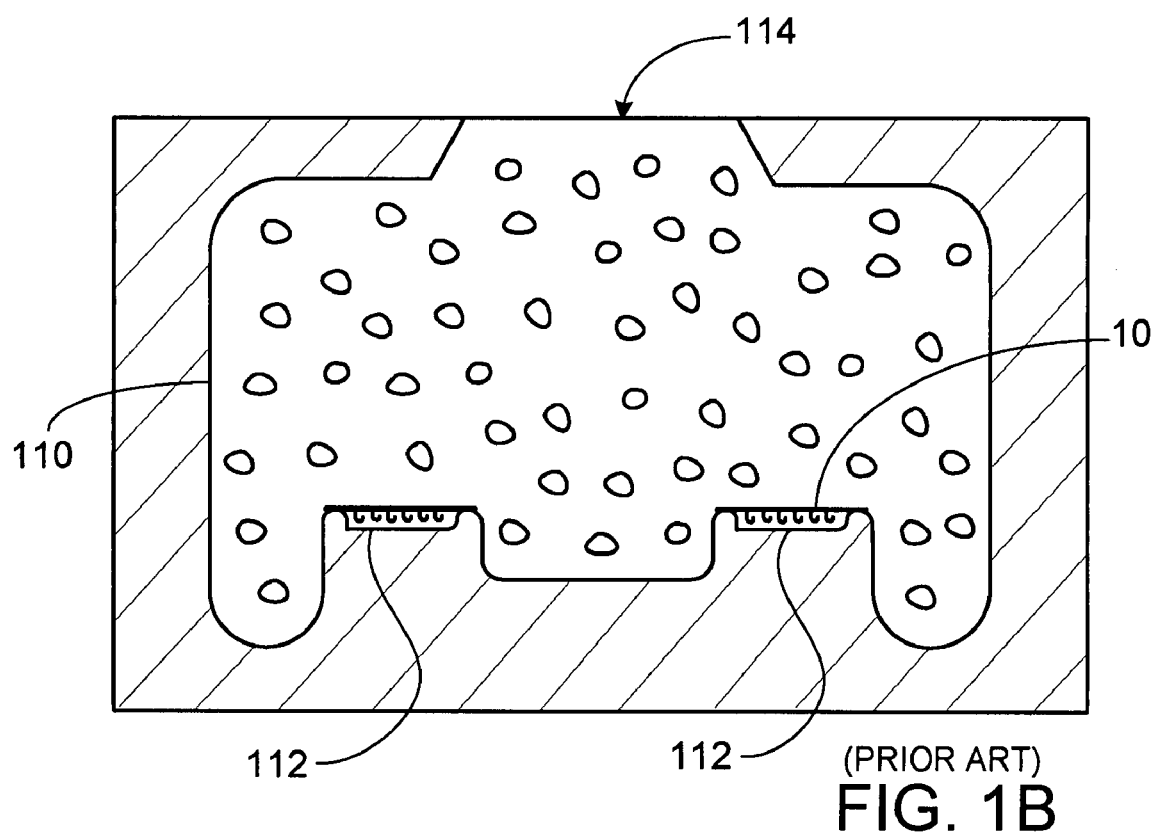
FIG. 1B is a cross-sectional view of a mold filled with a touch fastener and molding material.
Figure 2A:
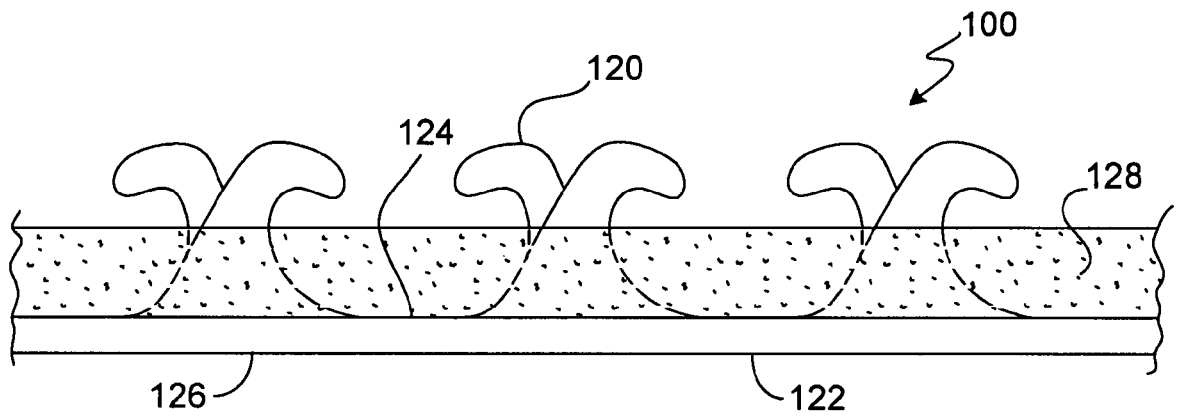
FIG. 2A is a side view of a touch fastener having foam attached to the upper face of a sheet form base.
Figure 2B:
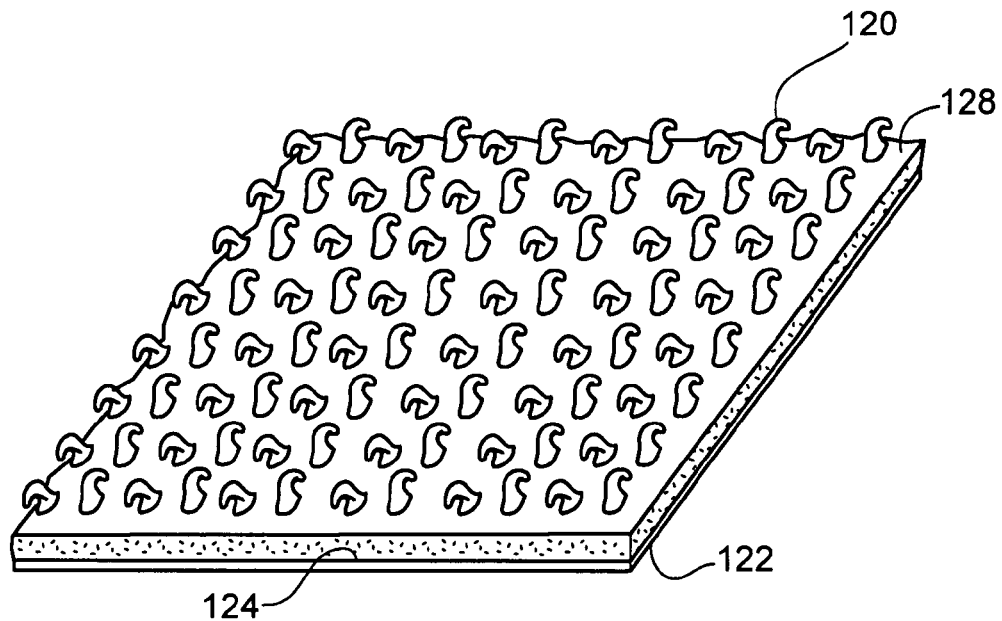
FIG. 2B is a perspective view of the touch fastener of FIG. 2A.

FIG. 2A illustrates a touch fastener that is useful, for example, in preventing the fouling problems disclosed above. A touch fastener 100 includes a plurality of fastener elements 120 (e.g., hooks) and a sheet form base 122 having an upper face 124 and a lower face 126. Fastener elements 120 extend from the upper face 124 of the sheet-form base 122. Attached (e.g., physically bonded) to the upper face 124 of the sheet form base 122 is a foam 128. The foam that is attached to the upper face of the sheet-form base forms a seal with the portion of the mold surface 110 surrounding the depression 112 of a mold (see FIG. 1B) when the touch fastener is correctly positioned within the depression. The resulting seal helps to prevent fouling of the fastener elements during the molding process. As depicted in FIG. 2B, the fastener elements 120 and foam 128 can cover substantially the entire upper face 124 of the sheet form base 122, allowing strips of fastener tape to be easily cut for use in the molding apparatus described herein.

Figure 3:
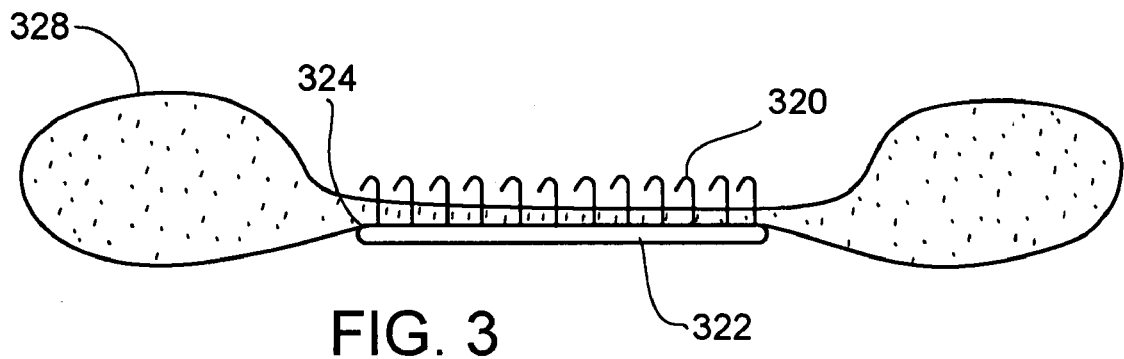
FIG. 3 is an end view of a touch fastener having foam attached to the upper face of the sheet form base, in which the foam extends longitudinally beyond the sheet form base.

In some instances it is desirable for foam 328 to extend longitudinally beyond the upper face 324 of the sheet form base 322, as shown in FIG. 3. In instances where the touch fastener is insert molded (e.g., in a mold used to manufacture automobile seat cushions), the extended foam can provide additional protection from fouling of the fastening elements 320. Moreover, the extended foam can also provide improved adhesion of the touch fastener to the foam material used in the seat foam bun. This improved adhesion is provided by the porous nature of the foam portion of the touch fastener. The pores allow the liquid foaming material to penetrate the foam portion of the touch fastener, thus physically bonding the seat foam bun to the foam of the touch fastener.

Figure 4A:
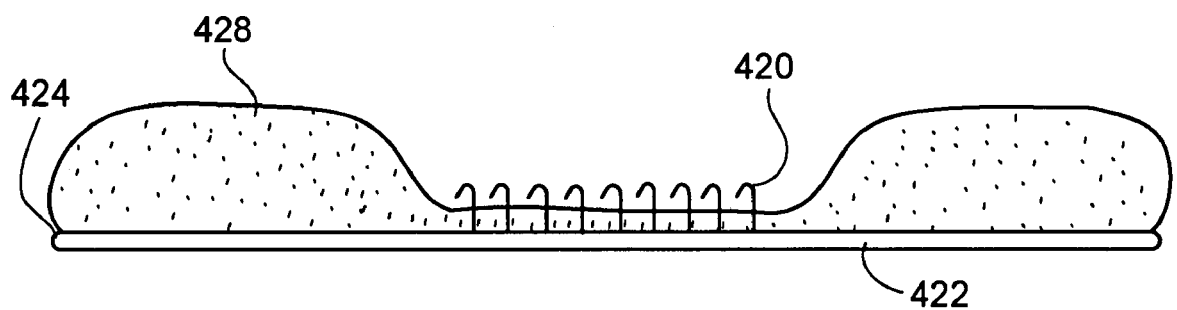
FIGS. 4A and 4B are end views of touch fasteners having foam attached to the upper face of a sheet form base where foam extends longitudinally beyond an array of fastener elements on the upper face of the sheet form base.
Figure 4B:
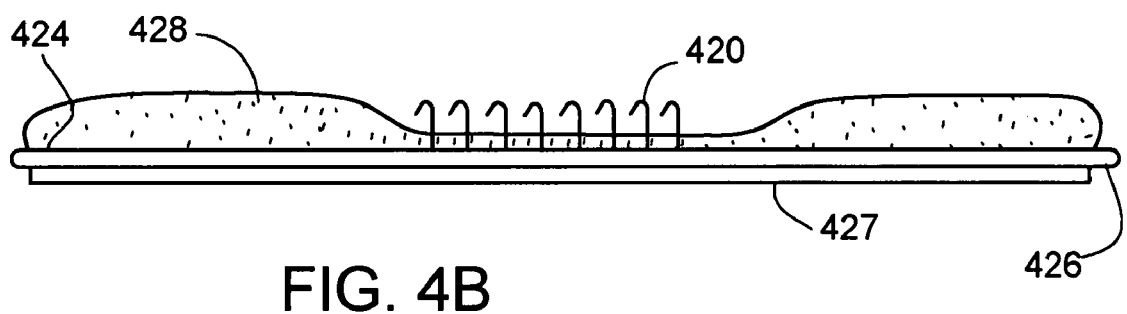

In other cases, for example in the touch fastener 400 shown in FIG. 4A, the foam 428 substantially covers the upper face 424 of the sheet-form base 422, but the fastener elements 420 do not substantially cover the upper face 424 of the sheet-form base 422. In this instance, the foam 428 and the sheet form base 422 can together provide additional protection to the fastener elements 420 when the fastener elements are positioned in a depression of a mold. A touch fastener having the sheet form base extend longitudinally beyond the fastener elements provides additional surface area to contact the mold surface. This additional surface can improve the effectiveness of the seal, and with the additional contact area, can also improve the adhesion of the touch fastener to the seat foam bun. In some cases, as depicted in FIG. 4B, the lower face 426 of the sheet form base 422 can be coated with an adhesive material 427, to further improve the adhesion of the touch fastener to the seat form bun. In other instances, the lower face 426 of the sheet form base 422 can be adhered to a non-woven or other fabric to enhance the mechanical bond between the touch fastener and the seat form bun. For example, the fabric can be a looped fabric to which the foam material of the foam bun strongly adheres.

Figure 5:
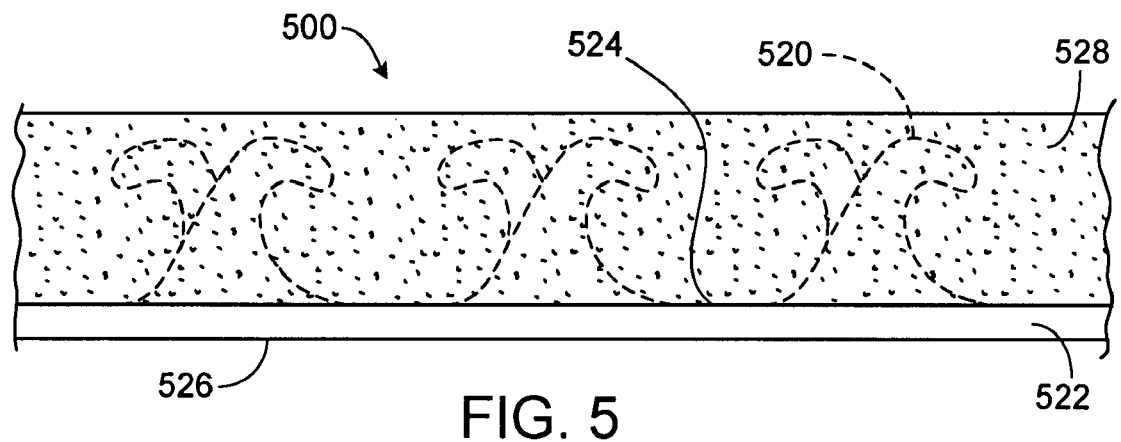
FIG. 5 is a cross-sectional view of a touch fastener having foam attached to the upper face of a sheet form base, in which the height of the foam is greater than the height of the hooks.

FIG. 5 illustrates a touch fastener 500 having a sheet form base 522 with an upper face 524 and a lower face 526, and foam 528 embedded on the upper face 524 of the sheet form base 522 such that the height of the foam 528 is greater than the height of the fastener elements 520 (e.g., hooks). When this touch fastener is used in mold processes, the foam 528 has a dual function, providing a continuous seal with the surface of the mold cavity and also providing a physical barrier between the hook elements 520. Accordingly, the foaming material used in the molding process is prevented from fouling the fastener elements 520 both by the seal formed around the hooks and also by the physical presence of another material in between the hooks.

In general, the density and stiffness of the foam 528 attached to touch fastener 500 is less than the density and stiffness of the foam used to form a seat cushion. Thus, when the seat cover is applied to the foam bun, the hooks 520 can be engaged with loops that are of sufficient stiffness to displace the foam 528 that is attached to the touch fastener 500. For example, the loop material can include monofilament to increase stiffness of the loops and to allow the loops to more easily push the foam material 528 of the touch fastener 500 out of the way of the fastener elements 520.

The touch fasteners described above can be made in a continuous sheet form and cut into any shape. For example, the touch fasteners can be die-cut. Suitable processes for cutting a touch fastener into a shape by die cutting are described, e.g., in U.S. Pat. No. 5,286,431, to Banfield et al., entitled MOLDED PRODUCT HAVING INSERT MOLD- IN FASTENER, the entire disclosure of which is herein incorporated by reference, and are further described in U.S. Pat. No. 5,766,385, to Pollard et al., entitled SEPARABLE FASTENER HAVING DIE-CUT PROTECTIVE COVER WITH PULL TAB AND METHOD OF MAKING SAME, the entire disclosure of which is incorporated herein by reference.

In instances where a mold surface is contoured e.g., where the depression in which the touch fastener is positioned is curved along its length, a segmented touch fastener can be used to accommodate the shape of the mold. FIG. 6A depicts an example of a segmented touch fastener 600 made up of a series of adjacent fastening segments 630 joined by flexible hinges 632. Each fastening segment includes a sheet form base 622 having an upper face 624 and a lower face 626, a plurality of fastening elements 620 integrally molded with and extending from the upper face 624 of the sheet form base 622, and a foam 628 attached to the upper face 624 of the sheet form base 622. As shown in FIG. 6A, in addition to being positioned around each fastening element 620 the foam 628 can extend peripherally around each array of fastening elements.

Figure 6C:
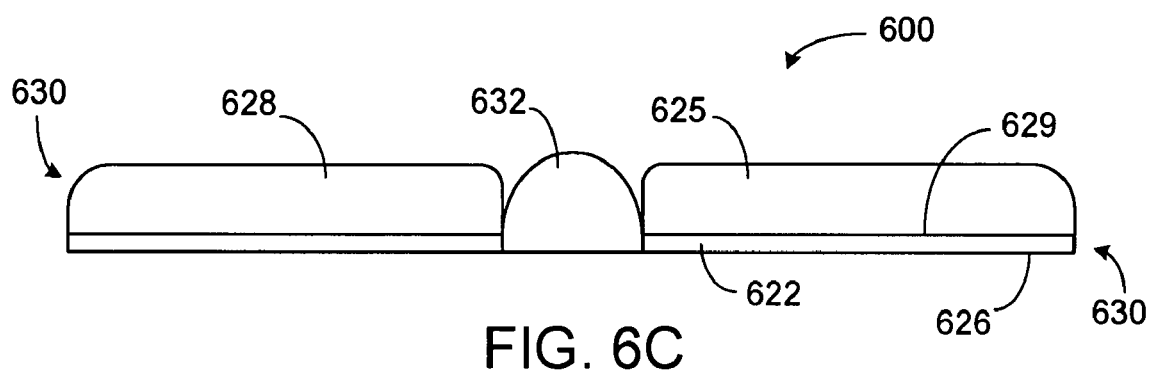
FIGS. 6C and 6D are side views of segments of segmented touch fasteners having foam attached to the upper face of a sheet form base.
Figure 6D:
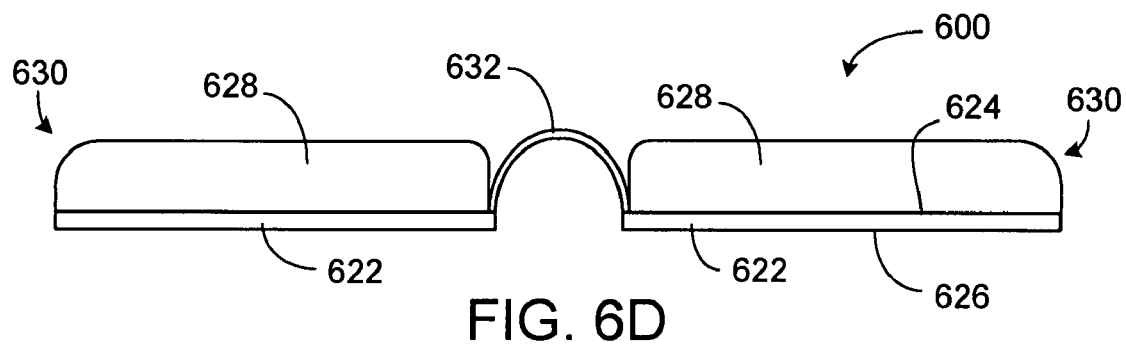
Figure 6A:
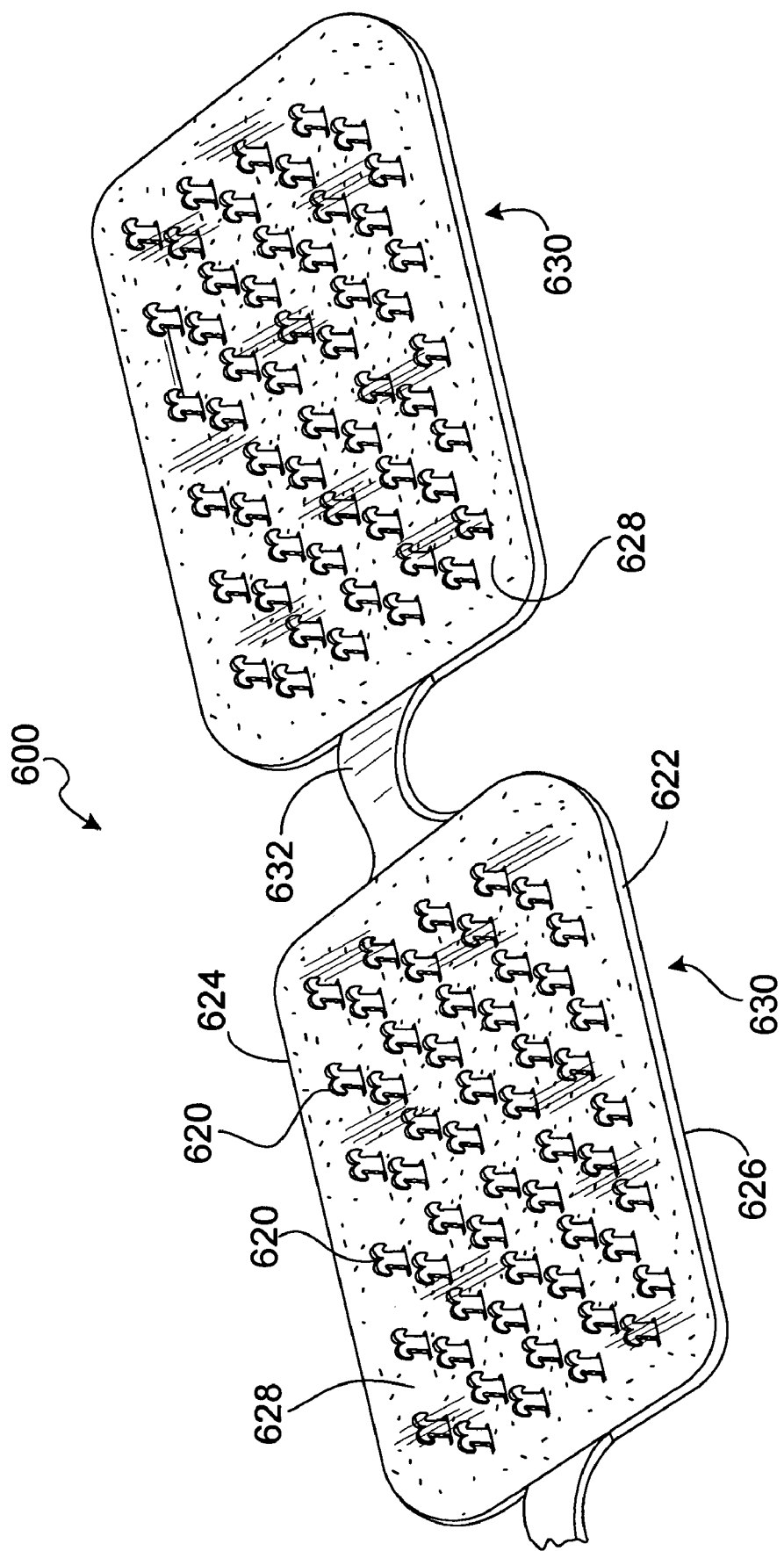
FIGS. 6A and 6B are perspective views of segments of segmented touch fasteners having foam attached to the upper face of a sheet form base.
Figure 6B:
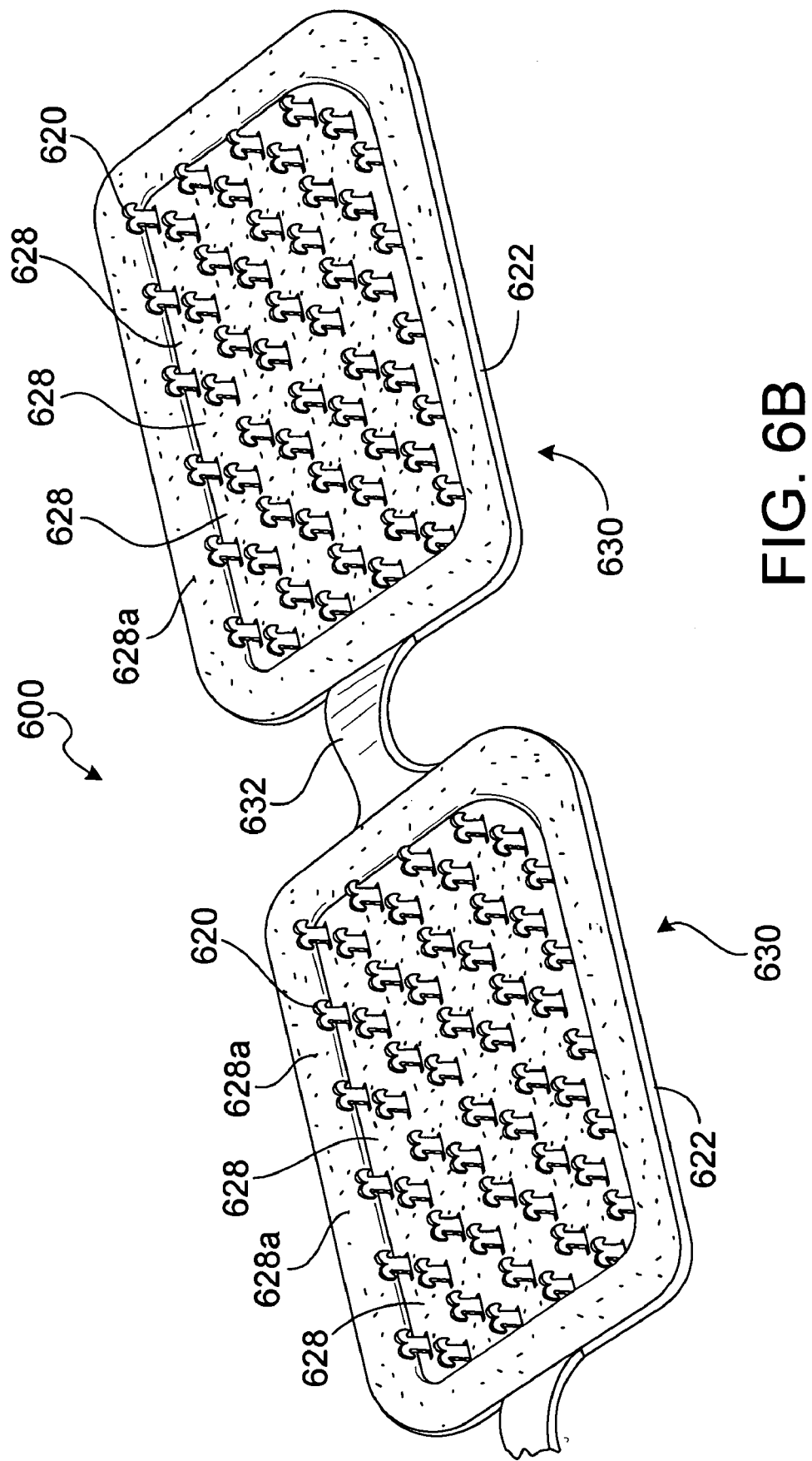

In some instances, for example, as shown in FIG. 6B, the foam 628*a* extending peripherally around the fastener elements 620 can be of a height greater than the height of the foam 628 around the stem portions of each individual fastener element 620.

FIG. 6C depicts an embodiment in which the flexible hinge 632 has a solid convex shape, such that hinge 632 is thicker in the middle than at the edges that connect with the fastener segments 630. In an alternative embodiment, shown in FIG. 6D, the flexible hinge 632 has a hollow convex shape where the thickness of the hinge 632 is substantially uniform throughout the length of the hinge 632 that connects the fastener segments 630, but the hinge 632 is shaped to define a convex arc.

Figure 7:
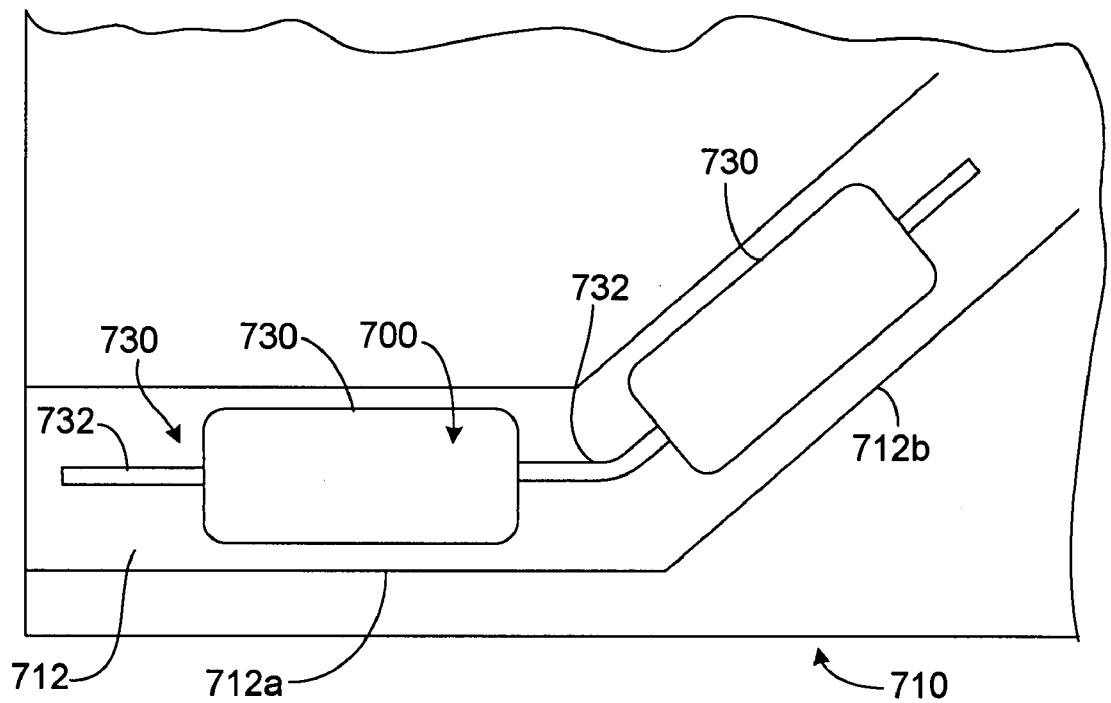
FIG. 7 is a top view of a bottom portion of a mold containing a segmented touch fastener.

FIG. 7 shows, in a top view, a touch fastener 700, made up of fastener segments 730 connected to each other by hinges 732 resting in a depression 712 of a mold surface 710, where the depression has two portions 712*a* and 712*b* that are angled relative to each other in the plane of the mold surface. The hinge 732 that is between the two segments 712*a* and 712*b* is bent so that the touch fastener 700 can follow the angle in the depression. For simplicity, only one angle is shown. However, a large variety of angles and path patterns can be accomplished, limited primarily by the flexibility of the hinge 732 and the dimensions (e.g., width or length) of the fastening segments 730.

In addition to incorporation into foam parts, the touch fasteners described herein can also be incorporated into unfoamed molded parts (e.g., car seat frames, high chairs, etc.), which can be formed of a thermoplastic or thermoset material.

Figure 1A:
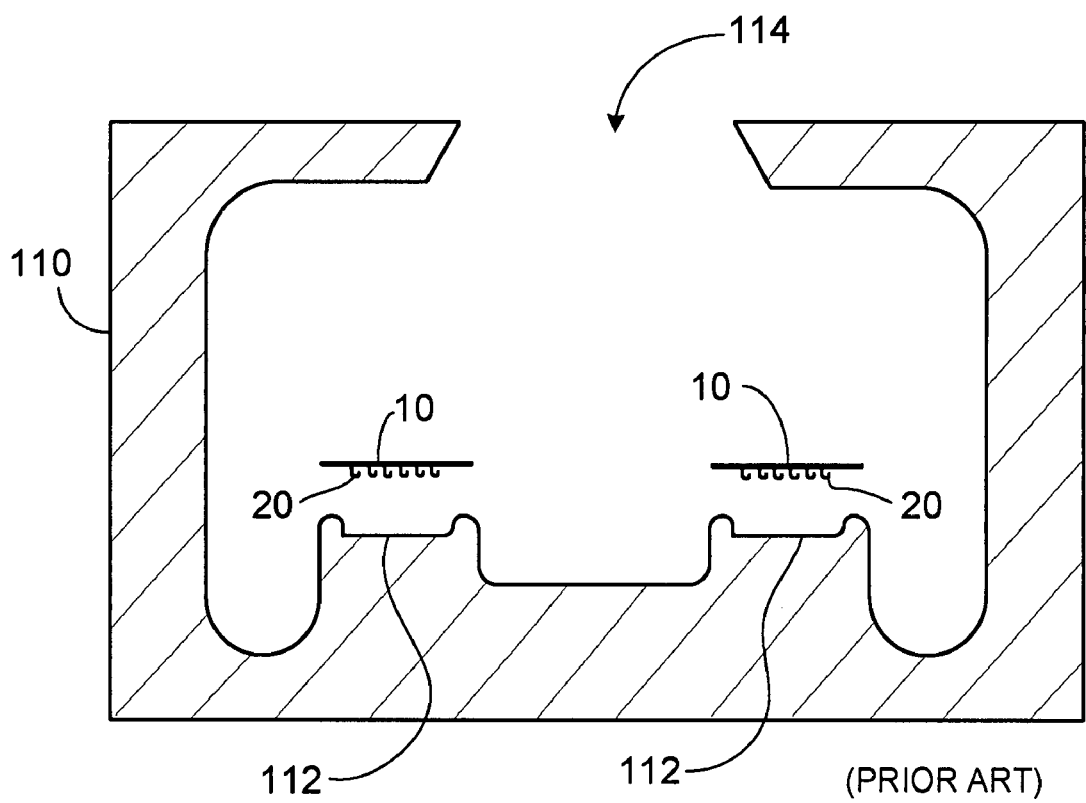
FIG. 1A is a cross-sectional view of a mold for use with a touch fastener. The mold has a cavity for insertion of the touch fastener and a depression where the touch fastener is positioned.
Figure 8:
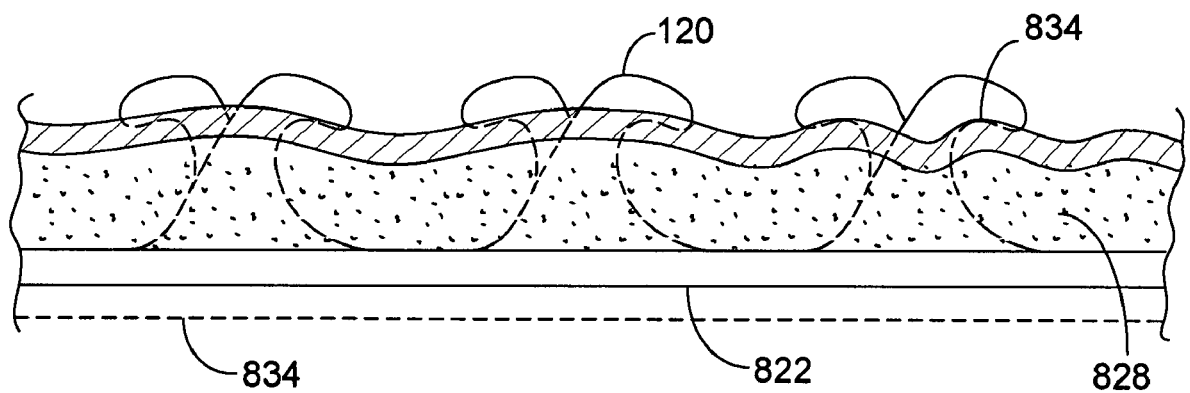
FIG. 8 is a side view of a touch fastener that includes metal particles in two alternate configurations.

The touch fasteners can include magnetically attractive material, which allows the touch fasteners to be positioned within a mold cavity (e.g., a depression) using magnetic attraction. Referring to FIGS. 1A and 1B, a touch fastener having magnetically attractive material can be positioned and drawn tightly toward the depression 112 using a magnetic force that attracts the magnetically attractive material in the touch fastener 100. This force effectively forms a seal or gasket between the depression 112 of the mold surface 110 and the foam 128 attached to the upper face 124 of the sheet form base 122. The magnetic particles can be embedded in the pores of the foam 128 or embedded in the fastening elements 120. Alternatively, as shown in FIG. 8, the touch fastener can include magnetic particles 834 that are coated on the top of the foam 828, which is attached to the upper face 824 sheet-form base 822, or the touch fastener can include magnetic particles 834 that are coated onto the lower face 826 of the sheet form base 822. The magnetically attractive material can include, for example an 80 percent nylon, 20 percent iron mix, or can be an adhesive that includes iron filings. Magnetic particles can also be incorporated in the foam or base materials.

Suitable processes for insert molding a foam bun onto a touch fastener are described in U.S. Pat. No. 5,945,193, to Pollard, entitled TOUCH FASTENER WITH POROUS METAL CONTAINING LAYER, the entire disclosure of which is incorporated herein by reference. Processes describing the incorporation of a magnetic attractant to touch fastener products are disclosed in U.S. Pat. No. 6,129,970 to Kenney et al., entitled TOUCH FASTENER WITH MAGNETIC ATTRACTANT AND MOLDED ARTICLE CONTAINING SAME, the entire disclosure of which is incorporated herein by reference.

In some instances the foam can be laminated to a mesh or scrim material. The scrim material can provide improved dimensional stability of the foam. Moreover, the scrim material can be magnetic (e.g., a ferrous-impregnated non-woven material), thus providing a magnetically attractive material as discussed above. Suitable examples of laminates are described in U.S. Pat. No. 5,518,795 to Kenely et al. entitled LAMINATED HOOK FASTENER, the entire disclosure of which is incorporated herein by reference.

Figure 9:
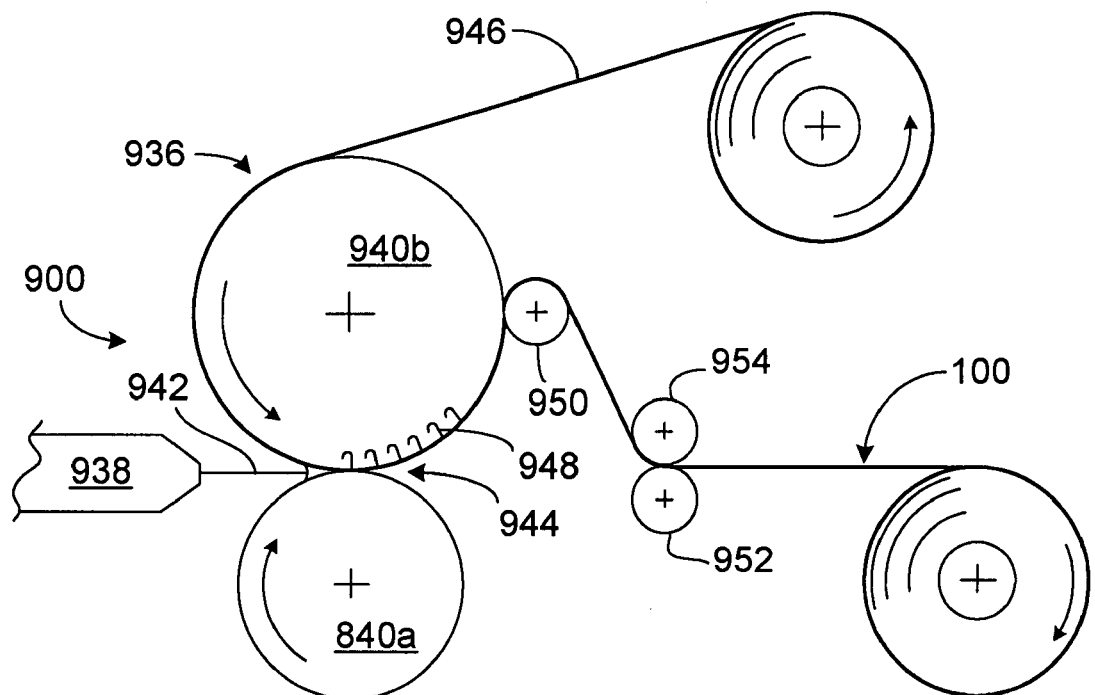
FIG. 9 shows schematically an apparatus and process for manufacturing a touch fastener having foam attached to the upper face of a sheet form base.

FIG. 9 illustrates one method and apparatus for producing the above described touch fasteners. The method utilizes the continuous extrusion/roll-forming method for molding fastener elements on an integral, sheet-form base described in detail in U.S. Pat. No. 4,794,028, the disclosure of which is incorporated herein by reference. As shown in FIG. 9, touch fastener 100 is formed by an extrusion apparatus 900 including a molding/calendaring assembly 936. The assembly includes an extrusion head 938, a base roll 940*a*, and a mold roll 940*b*. In FIG. 9, the relative position and size of the rolls and other components is not to scale.

The extrusion head 938 supplies a continuous sheet of molten resin 942 to a nip 944 formed between a base roll 940*a* and a mold roll 940*b*. As molten resin 942 enters nip 944, a sheet of foam 946 is fed through the nip 944 between the mold roll 940*b* and the molten resin 942. Due to pressure applied at the nip by rolls 940*a* and 940*b*, molten resin 942 is forced through the foam 946 into hook cavities 948, forming the hooks 120 described in FIG. 2A above. A guide roller 950 is situated diagonally upwardly to assist in the removal of the finished touch fastener 100 from mold roll 940*b*. A set of upper and lower take-up rollers 952, 954, rotating at a speed slightly higher than the rotating speed of the die wheel 934, are situated forwardly of the guide roller 950.

To provide a magnetically attractive touch fastener, iron filings can be included in the hook cavities 948, thus causing the iron filings to become embedded in the hooks 120.

Figure 10:
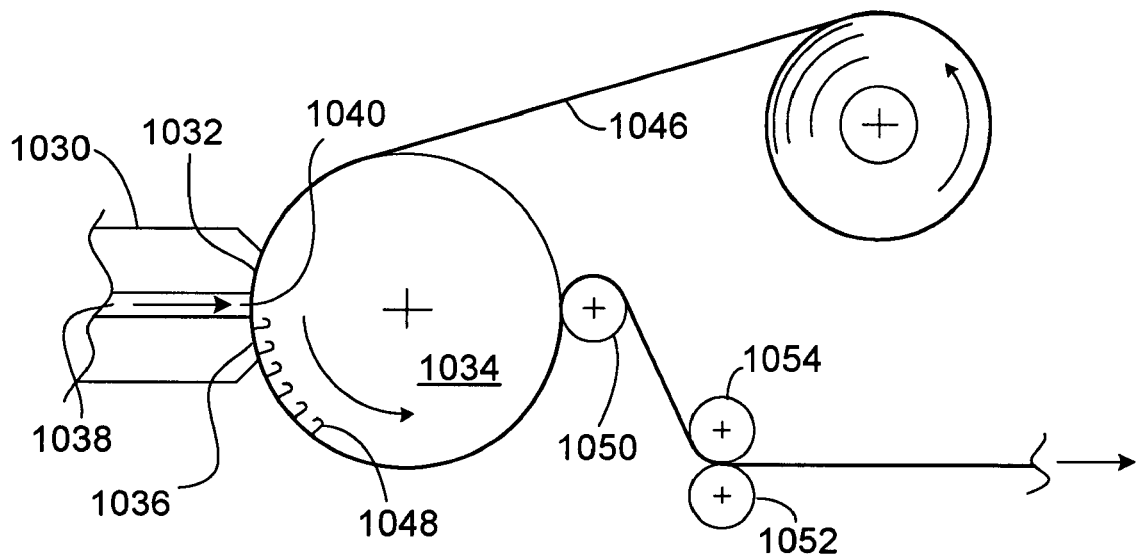
FIG. 10 shows schematically an apparatus and process for manufacturing a touch fastener having foam attached to the upper face of a sheet form base.

FIG. 10 shows an alternative process for manufacturing a touch fastener having a foam embedded into the upper face of a sheet-form base. An injection die 1030 has an upper half arcuate surface 1032 that is substantially equal in curvature to a die wheel 1034, and a lower half surface 1036 having a curvature that defines a predetermined gap with respect to the curved surface of the die wheel 1034. The injection die 1030 has a resin extrusion outlet 1038, which is situated centrally of the upper and lower surfaces 1032, 1036 and from which molten resin 1040 is extruded in a sheet form under a predetermined pressure.

The structure of the die wheel 1034 is substantially identical with the structure disclosed in U.S. Pat. No. 4,775,310, which is incorporated herein by reference in its entirety. Die wheel 1034 defines a multiplicity of hook-element-forming cavities 1046 with their bases opening to the circumferential surface of the die wheel. The die wheel 1034 is driven to rotate in the direction indicated by the arrow in FIG. 10.

A sheet of foam 1046 is drawn from a roll and introduced between the upper arcuate surface 1032 of the injection die 1030 and the circumferential surface of the die wheel 1034. A guide roller 1050 is situated diagonally upwardly, and a set of upper and lower take-up rollers 1052, 1054 rotating at a speed slightly higher than the rotating speed of the die wheel 1034, are situated forwardly of the guide roller 1050.

The foam is compressed as it enters into the nip (as shown in FIG. 9) or the predetermined gap (as shown in FIG. 10), and is in a compressed state as the pressure forces the molten resin through the foam and into the hook cavities in the mold roll (FIG. 9) or the die wheel (FIG. 10). While foam generally springs back to its former thickness, a portion of the foam sticks (e.g., physically adheres or bonds) to the molten resin as it moves through the nip, and does not spring back to its original thickness. Thus, where the foam is embedded in the sheet form base, it generally has a thickness that is less than its thickness prior to adhering to the molten resin. Moreover, the portions of the foam in direct contact with the fastener elements also physically bond to the molten resin that enters into the mold cavity (948 or 1048), causing an even greater reduction in the springing back of the foam in areas of the sheet form base adjacent to fastener elements. The degree to which a foam springs back to it original thickness varies with the type and density of foam and is generally expressed as a percentage.

Figure 11:
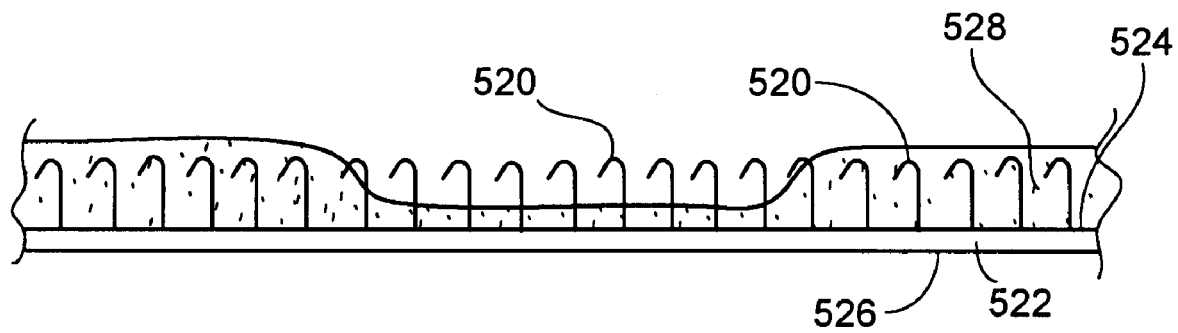
FIG. 11 is a schematic side view of a touch fastener having foam attached to the upper face of a sheet form base, in which the height of a portion the foam is greater than the height of the hooks, and the height of another portion of the foam is less than the height of the hooks.

In some cases, the foam springs back to a thickness that is greater than the height of the fastener elements, causing the fastener elements to be entirely submerged in the foam (see, e.g., FIG. 5). Although the fastener elements 520 are entirely submerged in the foam 528, loops of appropriate stiffness can be used to push through the foam 528 and engage the hooks 520 as discussed above. In instances where the density of the foam 528 is sufficiently less than the density of the fastener elements 520 and sheet form base 522, the foam 528 can be selectively burned to expose the fastener elements 520, providing a touch fastener as shown in FIG. 11.

Figure 12:
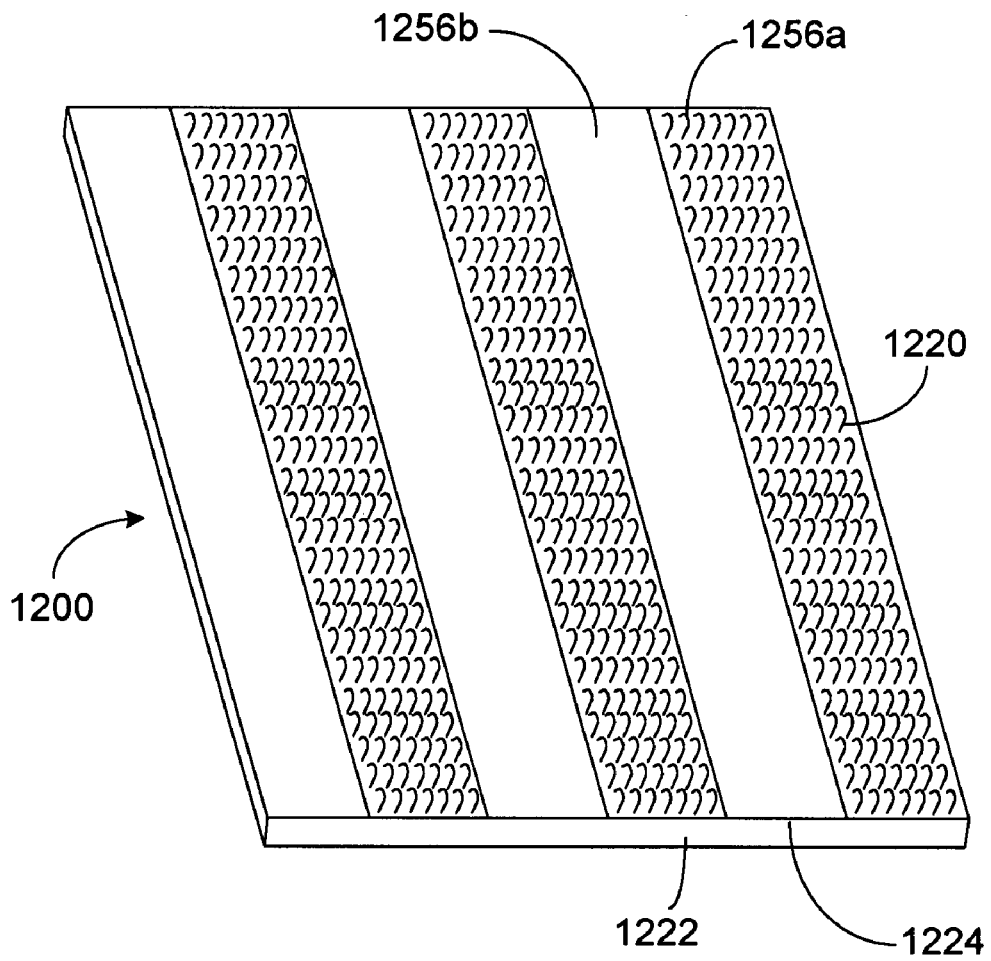
FIG. 12 is a perspective view of a touch fastener having hooks arranged in longitudinally extending tracts along the sheet form base.

In some instances, the hook cavities 948 in the mold roll 940 are positioned to manufacture touch fasteners having fastener elements that do not uniformly cover the sheet form base, but rather are positioned in longitudinally disposed strips. Referring to FIG. 12, a touch fastener 1200 includes a plurality of hooks 1220 that extend from the upper face 1224 of the sheet form base 1222. The touch fastener 1200 includes a striped like pattern of areas 1256*a* having hooks and areas 1256*b* without hooks.

OTHER EMBODIMENTS

A number of embodiments of the invention have been described. Nevertheless, it will be understood that various modifications may be made without departing from the spirit and scope of the invention.

For example, while the hooks shown in FIG. 2*a* are inverted J-shape hooks, other types of molded male fastener elements can also be used, including flat-topped, mushroom, and palm tree shaped fastener elements.

While the foam shown in FIG. 6*a* extends peripherally around each group (i.e. array) of fastener elements, in some cases the foam can extend peripherally around only a portion of each group of fastener elements.

Figure 13C:
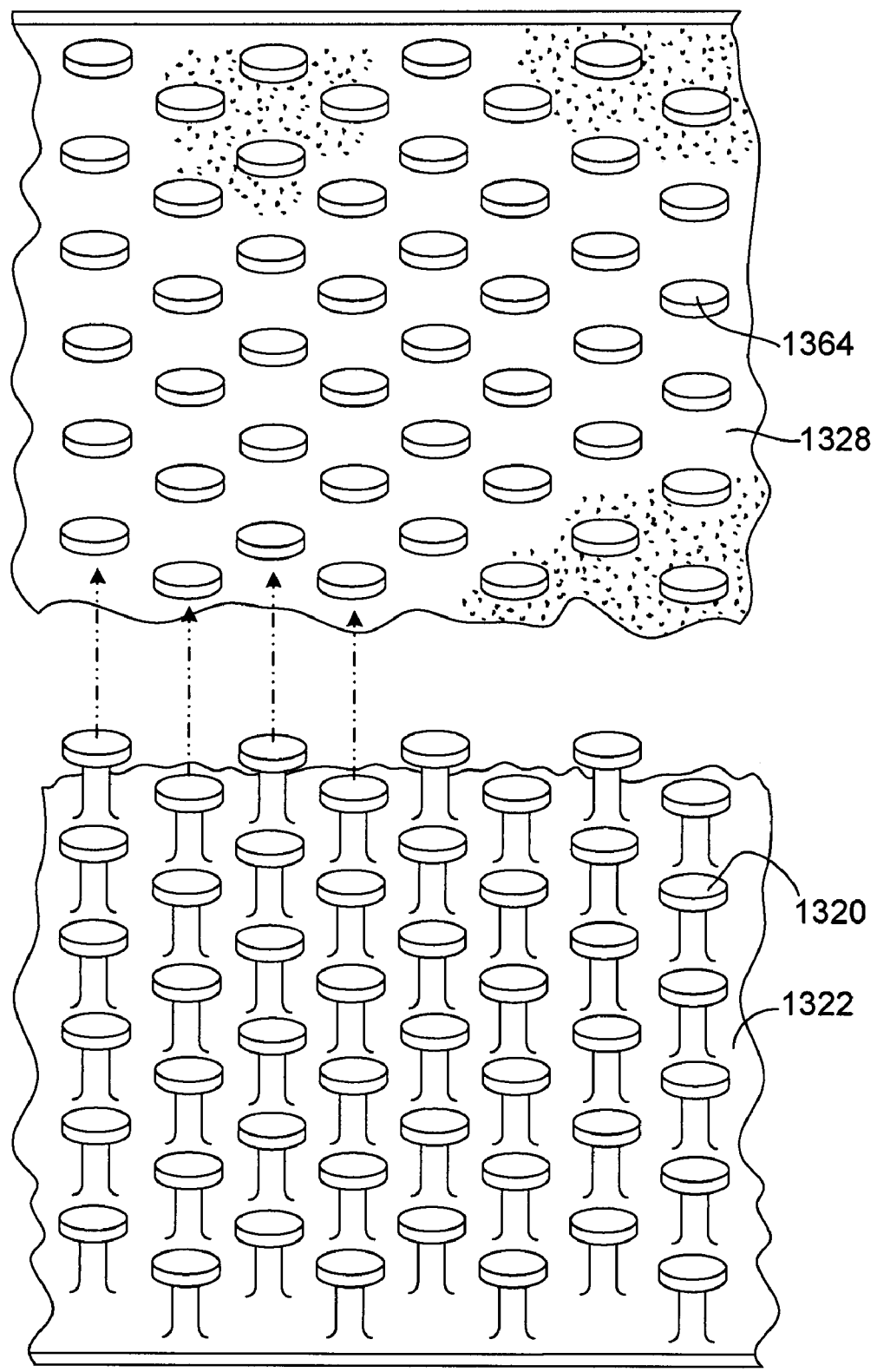
FIG. 13C shows registration of holes in the foam or other material with the preformed fastener elements.

An alternate method of making touch fasteners attached to a foam or non-woven material is depicted in FIGS. 13A-13C. For example, a sheet form base 1322 having an upper face 1324, a lower face 1326, and male fastener elements 1320 positioned on the upper face 1324 is positioned on a base roll 1360. A foam material 1328 having openings (e.g., slits or holes) is positioned on a material roll 1364. Pressure is applied to the sheet form base and foam material at the nip of the base roll 1360 and material roll 1364 while the sheet form base 1322 and the foam material 1328 are pulled simultaneously from the base roll 1360 and material roll 1364. The pressure causes the male fastener elements 1320 of the sheet form base 1322 to engage the foam material 1328 in the portions of the foam having holes. See, e.g., FIG. 13B, in which the foam material 1328 is adjacent to the upper face 1324 of the sheet form base 1322 and the fastener elements 1320 are protruding through the foam 1328.

In some instances, as depicted in FIG. 13C, the holes 1364 in the foam material 1328 are co-registered with the male fastener elements 1320 of the sheet form base 1322. While FIG. 13C depicts foam having holes, other embodiments are also envisioned. For example, the holes can be slits or other openings, and the material can be a non-woven or other porous material rather than a foam.

In some instances, the foam is neither physically attached to or embedded in the base of the touch fastener, but is adjacent to the base of the touch fastener, and is held in place for example by the fastening elements.

In some instances, a fibrous non-woven material can be used in place of the foam.

Accordingly, other embodiments are within the scope of the following claims.

What is claimed is:

1. A touch fastener, comprising:
    a sheet form base having an upper face and a lower face;
    a plurality of male fastener elements, each fastener element having a stem molded integrally with and extending from the upper face of the sheet form base; and
    a foam disposed between at least some of the fastener elements, wherein the foam is adhered to the upper face of the sheet form base and adhered, in a compressed state, directly to lower portions of the stems of the fastener elements, whereby portions of the foam immediately adjacent the stems of the fastener elements are held in a more compressed state than portions of the foam spaced from the fastener elements.

2. The touch fastener of claim 1, wherein the touch fastener further comprises metal particles.

3. The touch fastener of claim 2, wherein the metal particles are embedded to the fastening elements.

4. The touch fastener of claim 2, wherein the metal particles are coated on the lower-face of the sheet form base.

5. The touch fastener of claim 2, wherein the metal particles are embedded in the foam.

6. The touch fastener of claim 1, wherein the foam extends longitudinally beyond the sheet form base.

7. The touch fastener of claim 1, wherein the fastener elements cover only a portion of the sheet form base and the foam covers the entire sheet form base.

8. A seat cushion comprising:
    a foam bun, comprising an elongated trench, and
    disposed in the elongated trench, a touch fastener comprising:
        a sheet form base having an upper face and a lower face;

a plurality of male fastener elements, each fastener element having a stem molded integrally with and extending from the upper face of the sheet form base; and a foam disposed between at least some of the fastener elements, wherein the foam is adhered to the upper face of the sheet form base and adhered, in a compressed state, directly to lower portions of the stems of the fastener elements, whereby portions of the foam immediately adjacent the stems of the fastener elements are held in a more compressed state than portions of the foam spaced from the fastener elements.

9. The seat cushion of claim 8, further comprising a fabric cover covering an outer surface of the foam bun, the fabric cover having an inner surface carrying a cooperating touch fastener that is positioned to engage the touch fastener on the foam bun.

10. The seat cushion of claim 8, wherein the foam extends beyond the sheet form base and is bonded to the foam bun.

11. A molded polymeric article comprising:

a body having an outer surface; and a touch fastener component adhered to the surface, the touch fastener component comprising;

a sheet form base having an upper face and a lower face;

a plurality of male fastener elements, each fastener element having a stem molded integrally with and extending from the upper face of the sheet form base; and a foam disposed between at least some of the fastener elements, wherein the foam is adhered to the upper face of the sheet form base and adhered, in a compressed state, directly to lower portions of the stems of the fastener elements, whereby portions of the foam immediately adjacent the stems of the fastener elements are held in a more compressed state than portions of the foam spaced from the fastener elements.

12. The molded polymeric article of claim 11, wherein the foam covers substantially the entire upper face of the sheet form base, 13. The molded polymeric article of claim 11, wherein the height of portions of the foam is greater than the height of the male fastener elements.

14. The molded polymeric article of claim 11, further comprising a plurality of fastening segments, each fastening segment comprising a length and a width wherein the plurality of fastener segments are arranged adjacent each other along the length, and located between and joining each adjacent pair of fastening components, a flexible neck.

15. The molded polymeric article of claim 14, wherein the flexible neck is positioned at approximately a midpoint of each segment width, wherein the neck is narrower than the fastening segment, integral with the sheet form base of one or more adjacent fastening segments, and substantially uniform in composition with the sheet form base of one or more adjacent segments.

16. The molded polymeric article of claim 14, wherein the touch fastener is arranged such that segments of the fastener component are angled relative to each other in a plane.

17. A touch fastener comprising:

a plurality of fastening segments, each fastening segment having a length and a width, wherein the plurality of fastening segments are arranged adjacent each other along said length, each fastening segment further comprising:

a sheet form base having an upper face and a lower face;

a plurality of male fastener elements, each fastener element having a stem molded integrally with and extending from the upper face of the sheet form base; and a foam disposed between at least some of the fastener elements, wherein the foam is adhered to the upper face of the sheet form base and adhered, in a compressed state, directly to lower portions of the stems of the fastener elements, whereby portions of the foam immediately adjacent the stems of the fastener elements are held in a more compressed state than portions of the foam spaced from the fastener elements; and located between and joining each adjacent pair of fastening segments, a flexible neck.

18. The touch fastener of claim 17, wherein the flexible neck is located at approximately a midpoint of each segment width, wherein the flexible neck is:

narrower than said fastening segment:

integral with the base member of one or more adjacent segments; and substantially uniform in composition with the sheet form base of one or more adjacent segments.

19. The touch fastener of claim 17, wherein the foam extends around at least a portion of the plurality of fastener elements.

20. A method of forming a seat cushion comprising a foam bun, the method comprising:

providing a mold cavity having a shape corresponding to the shape of the foam bun;

positioning a touch fastener in the mold cavity, the touch fastener comprising:

a sheet form base having an upper face and a lower face;

a plurality of male fastener elements, each fastener element having a stem molded integrally with and extending from the upper face of the sheet form base; and a foam disposed between at least some of the fastener elements, wherein the foam is adhered to the upper face of the sheet form base and adhered, in a compressed state, directly to lower portions of the stems of the fastener elements, whereby portions of the foam immediately adjacent the stems of the fastener elements are held in a more compressed state than portions of the foam spaced from the fastener elements, so that the foam of the touch fastener makes a seal with the surface of the mold; and delivering a foam into the mold cavity and allowing the foam to solidify.

21. The method of claim 20, wherein the foam extends longitudinally beyond the sheet form base.

22. The method of claim 20, wherein the touch fastener further comprises metal particles.

23. The method of claim 20, wherein the metal particles are embedded in the fastening elements.

24. The method of claim 20, wherein the metal particles are coated on the lower-face of the sheet foam base.

25. The method of claim 20, wherein the metal particles are embedded in the foam.

26. A method of forming a molded polymeric article having a segmented touch fastener component, the method comprising:

providing a mold comprising a surface that defines a depression, wherein the depression follows a path having at least two portions that are angled relative to each other in a plane;

locating in the depression a touch fastener component comprising a plurality of fastening segments, each fastening segment having a length and a width, wherein the plurality of fastening segments are arranged adjacent each other along said length, each fastening segment comprising:

a sheet form base having an upper face and a lower face;

a plurality of male fastener elements, each fastener element having a stem molded integrally with and extending from the upper face of the sheet form base; and a foam disposed between at least some of the fastener elements, wherein the foam is adhered to the upper face of the sheet form base and adhered, in a compressed state, directly to lower portions of the stems of the fastener elements, whereby portions of the foam immediately adjacent the stems of the fastener elements are held in a more compressed state than portions of the foam spaced from the fastener elements, and located between and joining each adjacent pair of fastening segments, a flexible neck;

providing the separable component arranged in the depression such that it bends at the flexible neck and follows the path through the at least two portions that are angled relative to each other, such that the segments are angled relative to each other within a plane defined by the sheet form bases of the fastening elements;

delivering a liquid molding material into the mold such that the molding material substantially covers at least the surface of the mold in which the depression resides, wherein the molding material contacts a significant portion of the sheet formbase of the fastening component; and allowing the molding material to solidify to form the molded polymeric body, whereby the fastening component is secured to the molded body.

27. The method of claim 26, wherein the foam around at least a portion of the perimeter forms a gasket with the perimeter of the depression.

* * * * *

UNITED STATES PATENT AND TRADEMARK OFFICE
CERTIFICATE OF CORRECTION

PATENT NO. : 7,488,527 B2  Page 1 of 1
APPLICATION NO. : 11/725142
DATED : February 10, 2009
INVENTOR(S) : Emilio J. Munoz Herrero It is certified that error appears in the above-identified patent and that said Letters Patent is hereby corrected as shown below:

Title Page; item (60);

Please delete "continuation" and insert --divisional-- on the front page of patent under "Related U.S. Application Data", line 2.

Please delete "11/462,136" and insert --11/467,436-- (Column 1, line 4) in the specification.

Please delete "19/997,748" and insert --10/997,748-- (Column 1, line 5) in the specification.

Claim 3, please delete "to" and insert --in-- (Column 10, line 52).

Claim 11, please delete the semi-colon after "comprising;" and insert a colon --comprising:-- (Column 11, line 24).

Claim 12, please delete the comma after "base," and insert a period --base.-- (Column 11, line 40).

Claim 18, please delete colon after "segment:" and insert a semi-colon --segment;-- (Column 12, line 19).

Claim 26, delete "formbase" and insert --form base-- (Column 14, line 11).

Signed and Sealed this

Twenty-fourth Day of March, 2009

JOHN DOLL
*Acting Director of the United States Patent and Trademark Office*